United States Patent [19]
Johnson

[11] 3,990,236
[45] Nov. 9, 1976

[54] LOAD RESPONSIVE PUMP CONTROLS OF A FLUID SYSTEM

[75] Inventor: Howard L. Johnson, Joliet, Ill.

[73] Assignee: Caterpillar Tractor Co., Peoria, Ill.

[22] Filed: Feb. 23, 1976

[21] Appl. No.: 660,605

[52] U.S. Cl. .................................... 60/428; 60/445; 60/452; 60/486
[51] Int. Cl.[2] .................... F16H 39/46; F15B 18/00
[58] Field of Search ............ 60/421, 426, 427, 428, 60/445, 447, 452, 486

[56] References Cited

UNITED STATES PATENTS

| | | | |
|---|---|---|---|
| 3,672,161 | 6/1972 | Krusche et al. | 60/420 |
| 3,795,107 | 3/1974 | Ward | 60/428 X |

*Primary Examiner*—Edgar W. Geoghegan
*Attorney, Agent, or Firm*—Frank L. Hart

[57] ABSTRACT

Apparatus of a fluid system of a work vehicle for controlling the fluid delivered to work elements of the vehicle in response to the load exerted on the fluid system by the work elements.

4 Claims, 3 Drawing Figures

62'
40
32
88
84'
14
50
52
84
16
62
38
30

LOAD RESPONSIVE PUMP CONTROLS OF A FLUID SYSTEM

BACKGROUND OF THE INVENTION

In the operation of a fluid system serving a plurality of parallel work elements, the work elements sometimes demand large volumes of fluid from their associated hydraulic fluid pump. Occasionally there arise situations where the work elements demand fluid at a rate greater than the capacity of the pump. In such situations, one or more of the work elements will be demanding more fluid than is available while another work element may be requiring fluid at a very high pressure in order to continue to function under its existing load. Since the fluid passing to the work elements is free to travel the path of least resistance, the above-mentioned work elements demanding additional fluid will be supplied the required fluid at the expense of denying the increased pressure demanded by said other work element.

This problem associated with a plurality of work elements connected in parallel can be avoided by providing a pump having a capacity greater than the total demand capacity that could ever be required by the work elements. However, to so construct the work vehicle would produce a waste of materials, time, and labor for constructing, maintaining, and handling the resultant large pump. Further, the undesirably large pump would add considerable extra weight to the vehicle and would require extra fuel to operate which would further represent a waste of energy.

It is therefore desirable to provide fluid system apparatus which will control the system in a manner such that when the work elements approach a total fluid demand exceeding the capacity of the associated fluid pump, the actual demands of the work elements will be automatically overridden in response to a load pressure signal and fluid delivery to the individual work elements will be automatically, controllably maintained at reduced rates relative to their individual actual demand.

This invention therefore resides in controlling the fluid delivered to individual parallel work elements in response to a load pressure signal and the total fluid demand of the work elements relative to the maximum capacity or the pumps.

DETAILED DESCRIPTION OF THE INVENTION

Figure 1:
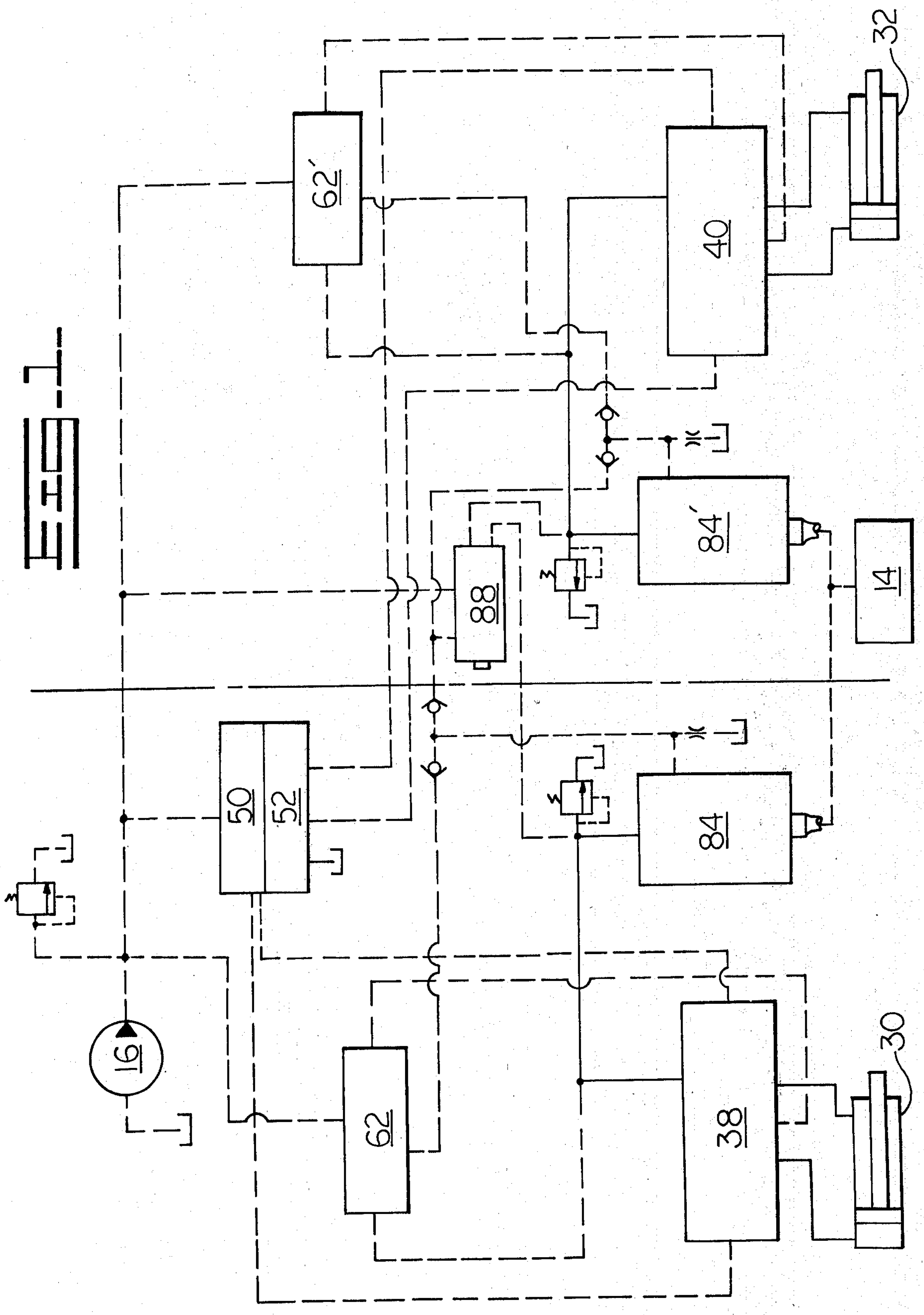
FIG. 1 is a general diagrammatic view of the apparatus of this invention.
Figure 2:
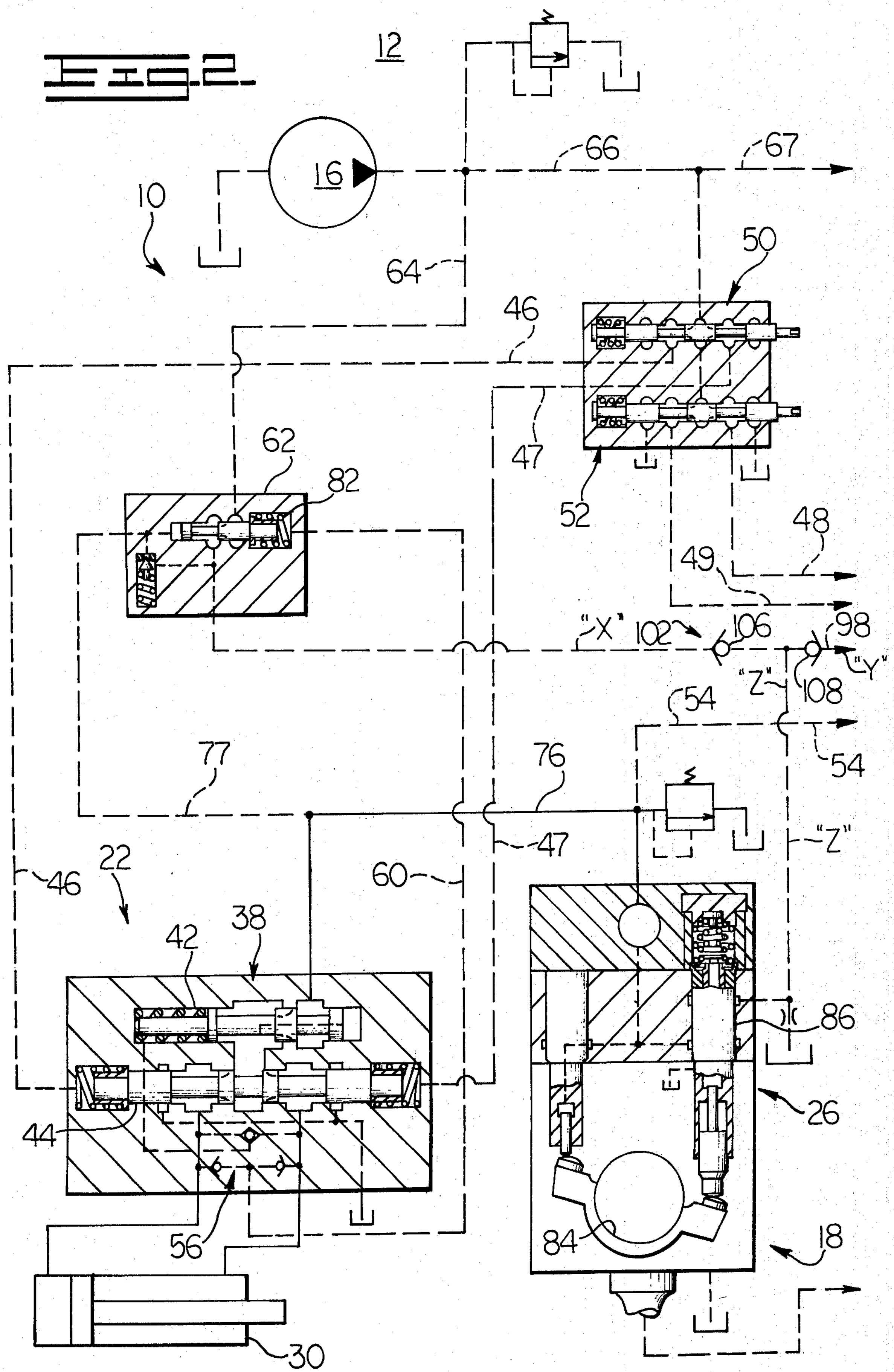
FIG. 2 is a more detailed diagrammatic view of a portion of the apparatus of FIG. 1.
Figure 3:
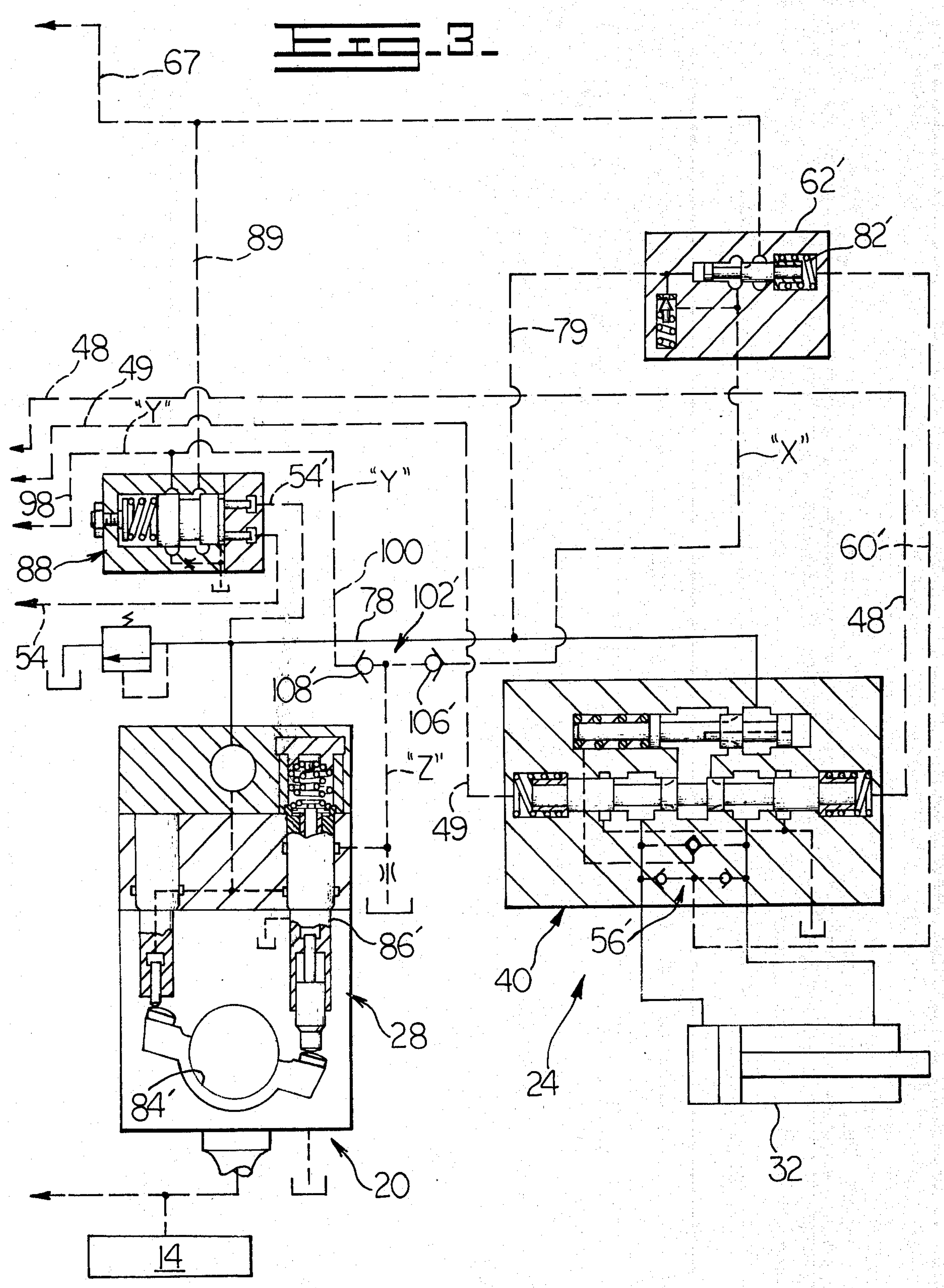
FIG. 3 is a more detailed diagrammatic view of the remaining portion of the apparatus of FIG. 1.

Referring to FIGS. 1–3, a fluid system, preferably a hydraulic system 10 of a work vehicle 12, has a power source 14, for example an engine, connected to a pilot pump 16 and a plurality of variable displacement hydraulic fluid pumps 18,20 for delivering hydraulic fluid. The hydraulic system 10 has one or more hydraulic circuits 22,24 served by the pilot pump 16 and the power source 14.

Each hydraulic circuit 22,24 has a respective variable displacement pump 18,20, and an associated pump control assembly 26,28 serving different work elements 30,32.

Each hydraulic circuit 22,24 has its respective work elements 30,32 connected to the discharge of its respective pump 18,20. Each of the work elements 30,32 has a control valve assembly 38,40.

Each of the control valve assemblies 38,40 has a pressure compensated flow rate control element 42,42′ and a directional flow control element 44,44′. The control valve assemblies 38,40 are positioned in the fluid stream passing from the respective pumps 18,20 to the respective work elements 30,32. Elements of each control valve assembly 38,40 are movable between first and second positions for selectively substantially opening and closing valve outlets. Each control valve assembly 38,40 is opened and closed in response to respective pilot pressure signals delivered through respective lines 46,47 and 48,49 from a respective work element pilot control valve 50,52. The work element pilot control valves 50,52 and control valves 38,40 and their functions are well known in the art.

A first means 54,54′ is provided for sensing the discharge pressure of each pump 18,20 and delivering a respective pressure signal in response thereto. A second means 56,56′ is associated with each work element 30,32 for sensing the respective load pressure and delivering a load pressure signal. The load pressure signals are passed through lines 60,60′.

Each circuit 22,24 has a control means, such as supply margin valves 62,62′, which is connected by lines 64,66,67 to the pilot pump 16 for controllably altering the magnitude of the pilot pressure signal from the pilot pump 16 and delivering resultant pressure signals "X","X′" for controlling the respective pumps 18,20. The pilot pressure signals are altered in response to respective preselected biasing forces and load pressure signals as opposed by the respective discharge pressure signals. The supply margin valves 62,62′ are connected to the discharge of their pumps 18,20 via lines 76,77 and 78,79 and to their respective load pressure signal via lines 60,60′. The supply margin valves 62,62′ each have a biasing means such as springs 82,82′ for providing the preselected biasing force.

Each of the variable displacement pumps 18,20 have a movable swash plate 84,84′ for controlling the fluid discharge rate of the respective pump 18,20. Each of the respective pump control assemblies 26,28 have a servo valve 86, 86′ for receiving a pressure signal and moving their swash plate 84,84′ in response to the received signal. Variable displacement pumps having associated servo valves are well known in the art.

In the above-described system, the signal "X", "X′" are delivered to their servo valves 86,86′ for controlling the discharge of the respective pumps 18,20 in response thereto.

A third means 88 is provided in the hydraulic system 10 for altering the magnitude of a pilot pump signal and delivering a resultant signal "Y" for controlling the pumps 18,20. The third means 88 alters the pilot pressure signal passing thereto via line 66,67,89 in response to a preselected biasing force that is opposed by a pressure signal that is responsive to the power output being required of the power source 14. The pump discharge pressures, which are a function of power output of the power source 14, are delivered to the third means 88 via lines 76,54 and 78,54′ for opposing the biasing force.

The third means 88 senses the power output of the power source 14, alters a pilot signal in response to a biasing force opposing the discharge pressures of the pumps, and delivers a resultant signal "Y" from the third means 88 via lines 98,100 to the respective pump control assemblies 26,28 of the respective pumps 18,20. The third means 88 can be, for example, a summing valve as is known in the art, or other means for measuring drain of the power output and delivering a signal in response thereto.

In the preferred embodiment shown, each circuit 22, 24 has a fourth means 102,102' for sensing the associated signals "X", "Y", and "X'", "Y", and delivering the largest of each sensed signal pairs as resultant signals "Z", "Z'" for controlling the respective pump 18,20. As shown, the fourth means 102,102' can each be a pair of check valves 106,108 and 106', 108'. The signals "X" or "Y", or "Z" and "X'", or "Y" or "Z'" are delivered to their respective servo valves 86,86' for biasing the associated swash plates 84,84' and controlling the fluid discharge rate of the pumps 18,20.

Other aspects, objects, and advantages of this invention can be obtained from a study of the drawings, the disclosure, and the appended claims.

What is claimed is:

1. In a fluid system of a work vehicle having a power source, a pilot pump connected to the power source for delivering pressure signals and at least two fluid circuits each having a variable displacement pump connected to the power source, a pump control assembly, work elements connected through a respective control valve to the discharge of a respective pump, and work element pilot control valves each connected to a respective work element and the pilot pump, said control valves each being movable between substantially closed and open positions in response to a pilot pressure signal as controlled by a respective work element pilot control valve, the improvement comprising:

a pair of first means for sensing the discharge pressure of each pump and delivering discharge pressure signals in response thereto;

a pair of second means for sensing the load pressure of the work elements and delivering load pressure signals responsive thereto;

a pair of control means for altering the magnitude of a pilot pressure signal in response to a respective biasing force and respective load pressure signal as opposed by a respective discharge pressure signal and delivering resultant signals "X", "X'" for controlling the respective pumps; and third means for controllably altering the magnitude of a pilot pressure signal in response to a biasing force opposed by the discharge pressure signals of the pumps and delivering a resultant signal "Y" for controlling each pump.

2. Apparatus, as set forth in claim 1, wherein each variable displacement pump of each fluid circuit has a movable swash plate for controlling the fluid discharge rate of a respective pump and each pump control assembly has a servo valve for receiving the signal "Y" and moving the swash plate in response thereto.

3. Apparatus, as set forth in claim 1, wherein each fluid circuit includes:

fourth means for sensing the resultant signals "X", "Y", and "X'", "Y" and delivering the largest of said sensed signal pairs as resultant signals "Z" and "z'" for controlling the respective pumps.

4. Apparatus, as set forth in claim 3, wherein each variable displacement pump of each fluid circuit has a movable swash plate for controlling the fluid discharge rate of a respective pump and each pump control assembly has a servo valve for receiving the respective signals "Z", "Z'" and moving the respective swash plate in response thereto.

* * * * *